United States Patent [19]

Bissonnette et al.

[11] Patent Number: 4,918,717
[45] Date of Patent: Apr. 17, 1990

[54] ALARM SYSTEM HAVING BIDIRECTIONAL COMMUNICATION WITH SECURED AREA

[75] Inventors: W. Michael Bissonnette, Sepulveda; Milton E. Hamilton, Glendora, both of Calif.

[73] Assignee: Knight Protective Industries, North Hollywood, Calif.

[21] Appl. No.: 234,445

[22] Filed: Aug. 23, 1988

[51] Int. Cl.$^4$ ............................................. H04M 11/04
[52] U.S. Cl. ........................................ 379/40; 379/42; 379/44; 379/45; 379/49
[58] Field of Search .................... 379/38, 40, 42, 43, 379/44, 45, 47, 51

[56] References Cited

U.S. PATENT DOCUMENTS

| | | | |
|---|---|---|---|
| 3,870,830 | 3/1975 | Tapiei | 379/40 |
| 4,273,961 | 6/1981 | Blank et al. | 379/40 |
| 4,465,904 | 8/1984 | Gottsegen et al. | 379/42 |
| 4,493,947 | 1/1985 | Loveless | 379/40 |
| 4,647,914 | 3/1987 | Alexander | 340/506 |
| 4,692,742 | 9/1987 | Raizen et al. | 379/51 |
| 4,743,892 | 5/1988 | Zayle | 379/38 |

Primary Examiner—Jin F. Ng
Assistant Examiner—Wing F. Chan
Attorney, Agent, or Firm—Sheldon & Mak

[57] ABSTRACT

A security system which includes a master unit for communication with a central control station by telephone and provides for a plurality of remote detectors located in different zones of a secured area to be selectively wired. The remote detectors communicate through the main power supply with a master unit which is powered by the mains. Microphones in the remote detectors can be selectively operated through the master unit as activated by the central control station to listen in to different zones to permit for identification of a security breach in different zones. A high-volume output mode speaker phone is provided to the master unit. Feedback circuitry generates audible signals when the system is armed or disarmed remotely. Separate activation of interior and perimeter detectors can be effected.

40 Claims, 9 Drawing Sheets

| | DISPLAYS | | | | | | | LINE CARRIER | | | | | | | HARDWIRE OUTPUTS | | | | |
|---|---|---|---|---|---|---|---|---|---|---|---|---|---|---|---|---|---|---|---|
| | POLICE LED | MED LED | FIRE LED | PERM LED | INT LED | ALARM MED LED | BEEP TONES | L.C. L.M. ON | L.C. L.M. OFF | L.C. SIREN ON | L.C. SIREN OFF | L.C. MIC 1 | L.C. MIC 2 | L.C. MIC 3 | H.V. SIREN ON | H.V. SIREN OFF | BSR LIGHT ON | BSR LIGHT OFF | H.V. MIC 1 | H.V. MIC 2 | H.V. MIC 3 |
| MAN POLICE | ⊠ | — | — | IF ARMED | IF ARMED | ⊠ | ⊠ | ⊠ | AFTER 4 MIN. | ⊠ | AFTER 4 MIN. IN S.C.C. | UPON REQST. | UPON REQST. | UPON REQST. | ⊠ | AFTER 4 MIN. IN S.C.C. | ⊠ | SEE NOTE #1 | UPON REQST. | UPON REQST. | UPON REQST. |
| MAN MED | — | ⊠ | — | IF ARMED | IF ARMED | ⊠ | ⊠ | ⊠ | AFTER 4 MIN. | — | — | UPON REQST. | UPON REQST. | UPON REQST. | — | — | ⊠ | SEE NOTE #2 | UPON REQST. | UPON REQST. | UPON REQST. |
| MAN FIRE | — | — | ⊠ | IF ARMED | IF ARMED | ⊠ | ⊠ | ⊠ | AFTER 4 MIN. | ⊠ | AFTER 4 MIN. IN S.C.C. | UPON REQST. | UPON REQST. | UPON REQST. | ⊠ | AFTER 4 MIN. IN S.C.C. | ⊠ | SEE NOTE #2 | UPON REQST. | UPON REQST. | UPON REQST. |
| MAN SILENT DURESS | — | — | — | IF ARMED | IF ARMED | — | ⊠ | ⊠ | — | — | — | UPON REQST. | UPON REQST. | UPON REQST. | — | — | ⊠ | — | UPON REQST. | UPON REQST. | UPON REQST. |
| MAN TEST | — | — | — | IF ARMED | IF ARMED | — | ⊠ | ⊠ | AFTER TEST DONE | ⊠ | AFTER 2 SEC | UPON REQST. | UPON REQST. | UPON REQST. | ⊠ | AFTER 2 SEC | ⊠ | — | — | — | — |
| MAN PERM | — | — | — | TOGGLE ON/OFF | IF ARMED | — | ⊠ | ⊠ | — | — | — | — | — | — | — | — | ⊠ | — | — | — | — |
| MAN INT | — | — | — | IF ARMED | TOGGLE ON/OFF | — | ⊠ | ⊠ | — | — | — | — | — | — | — | — | ⊠ | — | — | — | — |
| POLICE REMOTE | ⊠ | — | — | IF ARMED | IF ARMED | ⊠ | ⊠ | ⊠ | AFTER 4 MIN. | ⊠ | AFTER 4 MIN. IN S.C.C. | UPON REQST. | UPON REQST. | UPON REQST. | ⊠ | AFTER 4 MIN. IN S.C.C. | ⊠ | — | UPON REQST. | UPON REQST. | UPON REQST. |
| MED REMOTE | — | ⊠ | — | IF ARMED | IF ARMED | ⊠ | ⊠ | ⊠ | AFTER 4 MIN. | — | — | UPON REQST. | UPON REQST. | UPON REQST. | — | — | ⊠ | — | UPON REQST. | UPON REQST. | UPON REQST. |
| FIRE REMOTE | — | — | ⊠ | IF ARMED | IF ARMED | ⊠ | ⊠ | ⊠ | AFTER 4 MIN. | ⊠ | AFTER 4 MIN. IN S.C.C. | UPON REQST. | UPON REQST. | UPON REQST. | ⊠ | AFTER 4 MIN. IN S.C.C. | ⊠ | — | UPON REQST. | UPON REQST. | UPON REQST. |
| SILENT DURESS REMOTE | — | — | — | IF ARMED | IF ARMED | — | ⊠ | ⊠ | — | — | — | UPON REQST. | UPON REQST. | UPON REQST. | — | — | ⊠ | — | UPON REQST. | UPON REQST. | UPON REQST. |
| INT INTRUS A | — | — | — | IF ARMED | ⊠ | — | ⊠ | ⊠ | UNTIL USER RESETS | ⊠ | AFTER 4 MIN. IN S.C.C. | UPON REQST. | UPON REQST. | UPON REQST. | ⊠ | AFTER 4 MIN. IN S.C.C. | ⊠ | FLASH UNTIL RESET | UPON REQST. | UPON REQST. | UPON REQST. |
| INT INTRUS B | — | — | — | IF ARMED | ⊠ | — | ⊠ | ⊠ | UNTIL USER RESETS | ⊠ | AFTER 4 MIN. IN S.C.C. | UPON REQST. | UPON REQST. | UPON REQST. | ⊠ | AFTER 4 MIN. IN S.C.C. | ⊠ | FLASH UNTIL RESET | UPON REQST. | UPON REQST. | UPON REQST. |
| PERM INTRUS B-G | — | — | — | ⊠ | IF ARMED | — | ⊠ | ⊠ | UNTIL USER RESETS | ⊠ | AFTER 4 MIN. IN S.C.C. | UPON REQST. | UPON REQST. | UPON REQST. | ⊠ | AFTER 4 MIN. IN S.C.C. | ⊠ | FLASH UNTIL RESET | UPON REQST. | UPON REQST. | UPON REQST. |
| PERM INT ARM | — | — | — | ⊠ | IF ARMED | — | ⊠ | ⊠ | UNTIL USER RESETS | 1/2 SEC CHIRP | 1/2 SEC CHIRP | — | — | — | 1/2 SEC CHIRP | — | ⊠ | FLASH UNTIL RESET | — | — | — |
| REMOTE PERM ARM | — | — | — | IF ARMED | IF ARMED | — | ⊠ | ⊠ | AFTER 4 FLASH | 1/2 SEC CHIRP | — | — | — | — | 1/2 SEC CHIRP | — | ⊠ | AFTER 4 FLASH | — | — | — |
| REMOTE INT ARM | — | — | — | — | IF ARMED | — | ⊠ | ⊠ | AFTER 4 FLASH | CHIRP | — | — | — | — | CHIRP | — | ⊠ | AFTER 4 FLASH | — | — | — |

TABLE 1. FUNCTIONS

FRONT PANEL / R.F. REMOTE CONTROL

FIG. 9.

ALARM SYSTEM HAVING BIDIRECTIONAL COMMUNICATION WITH SECURED AREA

BACKGROUND

This invention relates to security systems. In particular it relates to a system for home and personal security.

Many systems have been developed for signalling an alarm either by an output siren located in a home or at a central control station when the security of a particular area has been breached. A general problem with most such security systems is the high frequency of false alarms which in time results in alarms being ignored. At times when the alarm is genuine, this can cause disastrous results. It is accordingly important to provide for a system which minimizes the possibility of false alarms and simultaneously provides as much information as possible about the secured area. It is also important to provide a system which can provide for fast response by emergency services such as police, hospital services or a fire department. Similarly, the system should also be able to provide a facility whereby an alarm can be silently activated so as not to disturb an intruder during the process of a crime. Danger to occupants can thereby be minimized and the likelihood of apprehension of the intruder is increased.

Another difficulty with known home security systems is the need to hard-wire connect a control unit and detectors at different locations in the home. This results in a security system being physically affixed to a home. Accordingly, when the purchaser of a system moves to a location, the system cannot be removed.

There is accordingly a need to provide for an improved security system to minimize these drawbacks with existing systems.

SUMMARY

By this invention the applicants seek to overcome the disadvantages with known systems.

According to the invention a security system comprises a master unit for location in an area to be secured, the master unit including means for communicating with a central control station through a telephone line. There are multiple remote detectors for location in different zones in the secured area, which are operationally connected with the master unit. On activation of the master unit due to activation of a remote detector, the central control station is enabled to identify which remote detector is activated.

The remote detectors selectively include microphones which are rendered operational by the master unit as selectively activated by the central control unit. Thus an operator at the central control station can listen in selectively to different zones in the secured area. The microphones are of relatively high sensitivity and is responsive to high volume amplification. The system at the central control station is programmed to distinguish between different sounds being received through the remote microphones. Thus the central control station can distinguish, for instance, between an intruder, an animal, shattered glass, voices or the like.

The master unit includes a speaker phone with the ability to be switched to a high-volume output amplification mode, whereby an operator from the central control station can selectively transmit communications into the secured area.

Feedback means in the nature of an audible response from a security siren located in or adjacent the secured area is provided to enable a user in the vicinity of the secured area to determine the arming or disarming of the master unit from a position remote from the secured area. Arming and disarming of the master unit can be effected by a hand-held remote control unit such that after operation of the remote control unit, the audible feedback signal will provide an indication that the security system is armed or disarmed.

The master unit preferably includes switches to signal selectively for an emergency services in the nature of the police, paramedics or fire department. Additionally a silent alert signal and test signal can be transmitted from the master unit to a central control station.

The master unit system and supporting remote detectors are portable such that when a user purchasing a security system permanently leaves a particular home or security area, the system can be removed and reestablished at a new home or security area. Installation is simple.

Through the central control station, which includes stored information about a user and a secured area, it is possible to patch in or cross-connect police, medical or fire services directly with the secured area. This permits an efficient response by emergency services. On cross-connecting the police, fire department or paramedics, these services can directly monitor the needs at a secured area.

The master unit includes a control panel with touch buttons to identify emergency services such as the police, medical or fire services. A user would directly communicate through the touch button and corresponding switch activated by the button which services are needed. The pre-programmed, stored information of the user displayed at the central station enables the operator at the station to communicate effectively with the user through two-way voice communication through a telephone line which is automatically enabled on activation of the master unit. The one-touch effect, namely without dialing, permits for speedy communication between the master unit, central control station and selective emergency services. Portable remote units for RF communication with the master unit in the vicinity of the secured area provide for activation of emergency services remotely from the master unit.

The invention is further described with reference to the accompanying drawings.

DRAWINGS

FIG. 7 is a schematic of the RF receiver of the master unit.

DESCRIPTION

Figure 1:
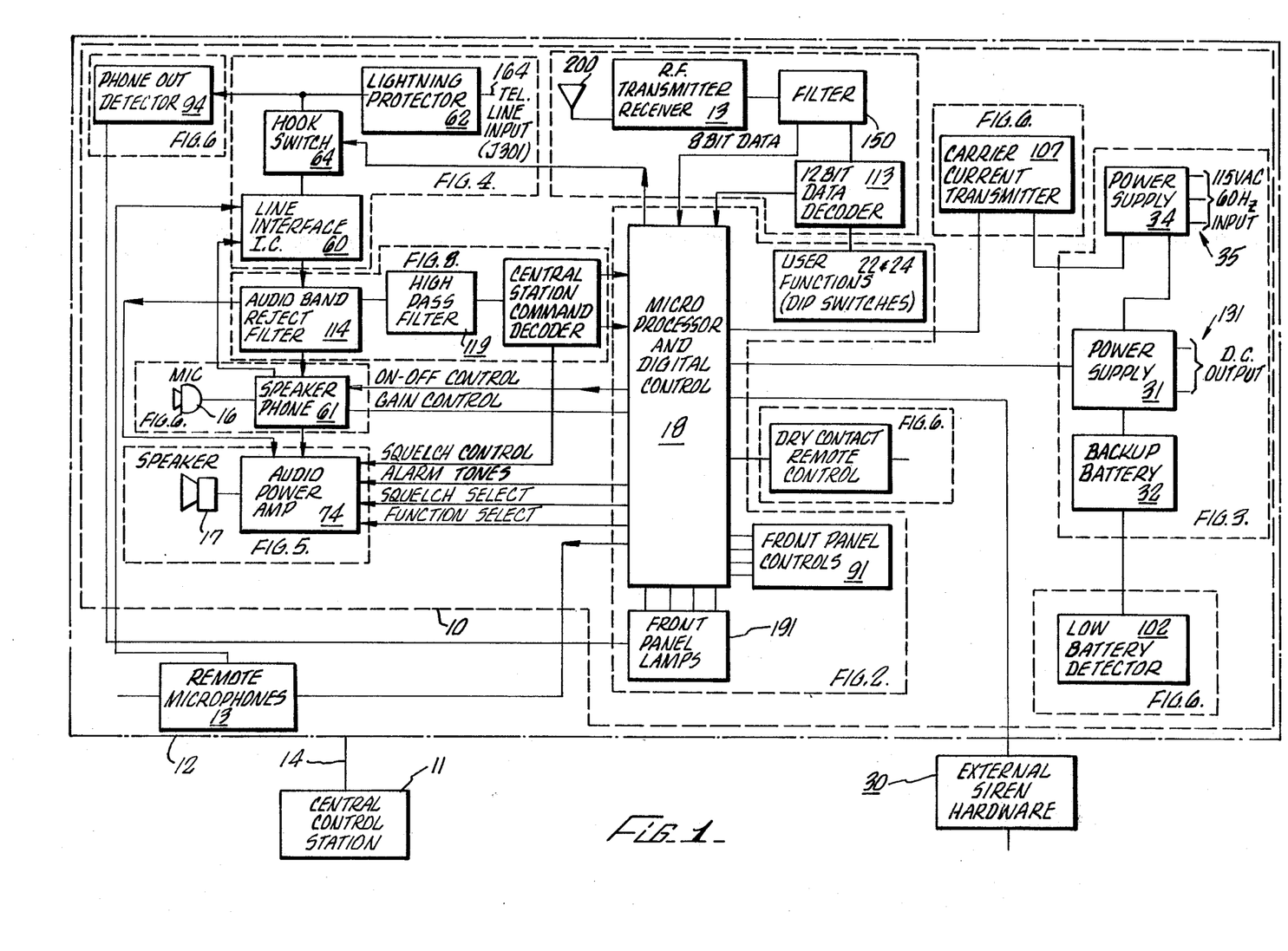
FIG. 1 is a block diagram illustrating the master unit components together with remote detectors and diagrammatically a secured area and a central control station.

A master alarm unit 10 for location in an area 12 to be secured includes a master alarm unit 10 connected by means of a telephone line 14 with a central control station 11. Within the secured area 12 are remote microphones 13.

The master unit 10 is part of a microprocessor controlled emergency alarm security system. The master unit automatically contacts a central unit at a control station 11 by means of the telephone line 14 between the master unit 13 and the central station 11 whenever it receives an alarm input. The alarms may be received at the control station 11 directly from either a switch on the front panel of the unit 13, or from an RF transmitter 15 coded to the user's unit identity. The alarms to the central unit may be for emergency services of the police, medical department or fire department. Additionally, silent duress or test signals from the master unit 13 can be transmitted.

When the central station 11 receives a call from a master unit 10 the central station 11 outputs an identification request. The request results in the master unit 13 sending an eight-digit decimal coded word that tells the central station 11 what master unit is calling (5 digits), what type event is being reported (2 digits), and an eighth digit, which error checks the five-digit identity code. The code word allows a total of one hundred combinations of events and locations within the user's secured area 12 to be reported to the central control station 11.

Upon receipt of a valid identity code from the master unit 10, a computer at the central station 11 automatically displays all user information to the operator. The operator then has a control panel with eleven keys to control the master unit 10.

The operators control keys at the central control station 11 provide the following functions:

1. IDENTIFY
Resends the master unit code and event.

2. SPEAKERPHONE
Turns on the speakerphone so that a two-way voice link is established between the operator and the master unit user.

3. HIGH GAIN MICROPHONE
Turns on the microphone 16 of the master unit 10 in high gain so that the operator can hear what is happening in the area of the microphone 13.

4. MICROPHONE #1
Turns on remote Microphone #1, namely numeral 13, so that the operator can listen in to the zone of its location in the secured area.

5. MICROPHONE #2
Turns on remote Microphone #2, namely numeral 13, so that the operator can listen in to the zone of its location in the secured area.

6. MICROPHONE #3
Turns on remote Microphone #3, namely numeral 13, so that the operator can listen in to the zone of its location in the secured area.

7. TALK
Turns on the speakers 17 of the master unit so that the operator can talk to the master unit 10. This mode has a much higher volume than a conventional speakerphone associated with a telephone.

8. GO TO SILENT DURESS
The master unit 10 acts as if it were not activated, however, the operator can still listen to the unit 10.

9. GO FROM SILENT DURESS
The operator can return the master unit 10 to the normal operating mode and perform any desired function.

10. CALL AGAIN
The master unit 10 will hang up and recall. This function allows the operator to trY for a better telephone line if the connection is bad.

11. HANG UP
This command is issued after every communication. It tells the master unit 10 to disconnect from the telephone line and wait for the next activation.

In addition to the above, the microprocessor 18 in the master unit 10 also controls several functions. The functions controlled by the microprocessor 18 include sirens, remote lights, control panel lights on the master unit and audible beeps. The combinations are extensive and are set out in FIGS. 1 and 9.

The following description describes how the electronic circuitry of the master unit 10 operates and interfaces with microprocessor 18.

FIG. 1 is a block diagram of the master unit 10. The master unit 10 is mounted on a circuit board in a casing for location in the secured area 12. The casing has various front panel controls 91 which are for designating emergency services such as the police, medical and fire. Additionally there is a front panel control for a silent duress signal and this is unmarked. A further front panel control is for test signals to the central control station 11. Additional front panel controls are for a perimeter switch and indicator, and an interior switch an indicator. There are indicator lamps 191 for indicating when the phone connection is out, the battery is low, and two way voice activation by the alarm memory panel control.

The master unit 10 is constructed about a microprocessor digital control element 18. The various detail schematics in FIGS. 2 to 8 are illustrated in block form in FIG. 1. The dash lines in FIG. 1 about various block elements indicate the respective FIGS. 2 to 8 containing the detailed circuitry.

The microprocessor 18 is connected with front panel lamps 191 as indicated and the front panel controls 91 as indicated. The remote microphones 13 are located about the secured area but away from the master panel. The microprocessor 18 is connected with the remote controls to control selectively the remote microphones 13 as required. Also the microprocessor 18 is connected with the audio power amp and speaker 17 which is mounted in the casing for the master unit. The microprocessor 18 can function to select the audio power amplifier 74, control squelch and particular alarm tones from the audio power amplifier 74.

Microprocessor 18 also controls the speaker phone 16 mounted in the casing of the master unit 10 such as to switch the speakerphone 61 on and off, and control the gain and audio input and output such that its operation can be substantially higher than that on conventional telephones. The audio power amplifier 74 is also interfaced with the central control station command decoder illustrated in FIG. 8 which provides a squelch control to the audio power amplifier 74.

Audio band reject filter 114 connects through a highpass filter 119 and the central control station command decoder with the microprocessor 18. The signal from the audio band reject filter 114 is directed both to the speakerphone 61 and the audio power amplifier 74. The signal input to the audio band reject filter is from a line interface IC 60 which receives a signal along the telephone line input 164 through a lightning protector unit 62 and a hook switch 64. A phone-out detector 94 is connected to the front panel lamp 191 and the telephone line 164 through the lightning protector 62.

Signals from remote control units are received by the RF receiver 15 and filtered by filter 150 and transmitted as 8-bit dip switch to the microprocessor 18 and through a 12-bit dip switch decoder 113 to the microprocessor 18.

Also connected with the microprocessor 18 are function dip switches 22 and 24. A carrier current transmitter 107 connects a power supply 34 with the microprocessor 18. The power supply 34 is supplied from a conventional 115 volt, 60 Hertz input 35. Power supply 34 is connected through a regulated power supply 31 to provide d.c. outputs 131, and is also connected to the microprocessor 18. A backup battery 32 connects with the power supply 31. A low-battery detector 102 is connected with the power supply 31 and also the front panel lamps 191.

Figure 2:
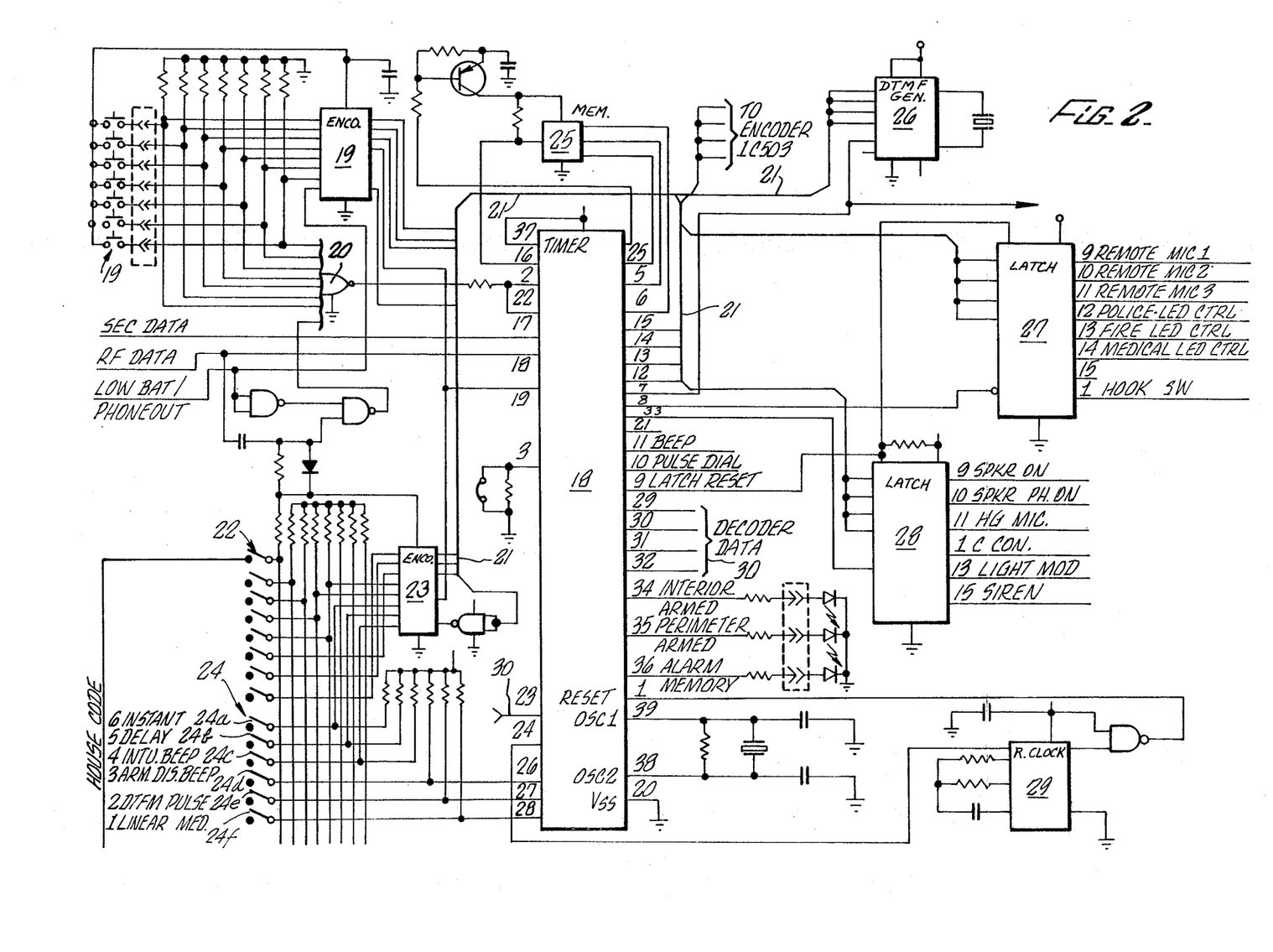
FIG. 2 is a schematic of a digital subsystem of the master unit.

The digital subsystem illustrated in FIG. 2 contains the digital control functions of the master unit 10. The functions are controlled by the microprocessor 18.

A closure of any of the seven front panel keypad switches 19 is sensed by IC 19. The specific contact switch 19 closed provides an input to the microprocessor 18 by means of a primary data buss 21 through Pins 12 through 15.

The position of dip switches 22 is sensed by IC 23 and placed on the main data buss 21 when requested by the microprocessor 18. IC 23 senses the position of the last 5 bits of the house code for decoding the short format RF data word, and it senses the position of the last three switches 24a, 24b, 24c of a second dip switch 24, namely a 6-position dip switch for function control. The first three positions 24d, 24e, 24f of the 6-position dip switch 24 are input to the microprocessor 18 on Pins 26 through 28.

IC 25 is a programmable memory chip and contains the customer account number, and central control station telephone numbers. Pins 5, 6 and 25 of microprocessor 18 are for control and data request. Data is transmitted to the microprocessor 18 on Pin 16. Both tone and pulse dialing is controlled by the microprocessor 18. DTMF tones are generated and transmitted by means of IC 26. Pulse dialing is controlled by Pin 16 of the microprocessor 18.

IC 27 and IC 28 perform function control of the current status of the master unit 10 as shown in Table 1. The specific function controlled by each IC pin is shown in FIG. 2. IC 27 is selected by microprocessor Pin 8. IC 28 is selected by microprocessor Pin 33. Data is transferred to the IC 27 and 28 by means of the data bus. IC 29 is a clock used to reset the microprocessor 18 and prevent microprocessor 18 lockup. In addition to the functions controlled by IC 27 and IC 28, the microprocessor 18 directly controls several functions by means of Pins 9, 10, 11, 21 and 34 through 36. Table 1 and FIG. 2 indicate functions.

The master unit 10 is capable of operation with two RF data formats referred to here as 5-bit and 8-bit house codes. The 5-bit house code is decoded directly by the microprocessor 18 from serial date input on Pin 18. The 8-bit format is decoded by an IC and the decoded data is transmitted along lines 30 to Pins 23 and 29 through 32 of the microprocessor. Commands from the central station 11 are decoded directly by the microprocessor 18. The serial digital data is input to the microprocessor 18 on Pin 17.

Figure 3:
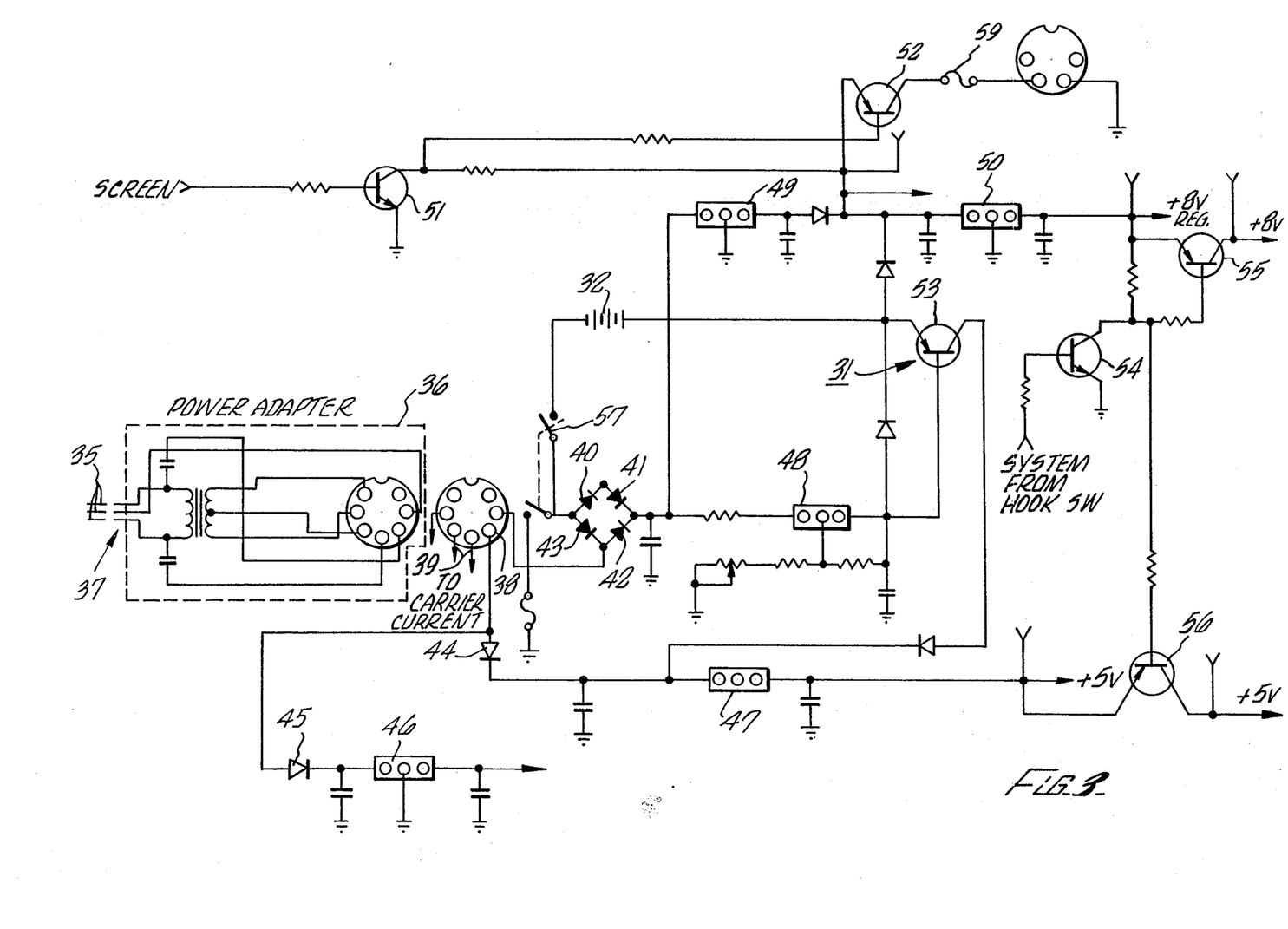
FIG. 3 is a schematic of the power supply for the master unit.

The power supply portion 34 of the master unit 10 is illustrated in FIG. 3 and provides all voltages required by the master unit 10, and in addition, supplies power for the remote microphones 13 and siren 30. The power supply section includes a battery charger 31 and battery 32 to allow the system to operate for up to 24 hours, under normal conditions, without its normal 115 VAC power source 35.

AC power adapter 36 is used With the master unit 10 with a plug 37 for connection with the power supply 35, and includes an 18 volt AC 1 amp center tapped output 38, and the coupling components 39 for the carrier current transmitter output.

The master unit 10 PC board includes all rectifier, regulation and switching functions, namely:

1. Diodes 40, 41, 42 and 43 through D205 rectify all power required by the battery charger 31, 15 VDC and 8 VDC circuits. Diodes 44 and 45 rectify the center tap voltage for use by the 5 VDC circuits. The use of the center tap greatly reduces total power dissipated on the PC board of the master unit 10.

2. The functions provided by the regulators used are as follows:
   a. IC 46 provides regulated 5 VDC for circuits requiring power only when 115 VAC is present.
   b. IC 47 provides regulated 5 VDC for circuits requiring power when the master unit 10 is on the standby battery.
   c. IC 48 is the regulator for battery charger 31 regulator
   d. IC 49 provides 15 VDC to the siren output and to the 8 VDC regulator.
   e. IC 50 provides 8 VDC for use by master unit 10 circuits.

3. Where possible, the supply voltage is removed from all circuits except during an activation requiring it. Transistors 51, 52, 53, 54, 55 and 56 provide the required switching functions. SWitch 57 removes all supply voltages from the master unit 10.

4. Two fuses are provided: Fuse 58 provides protection for the master unit 10, and fuse 59 provides protection for the siren circuit and prevents a siren short from causing a malfunction of the master unit 10.

Figure 4:
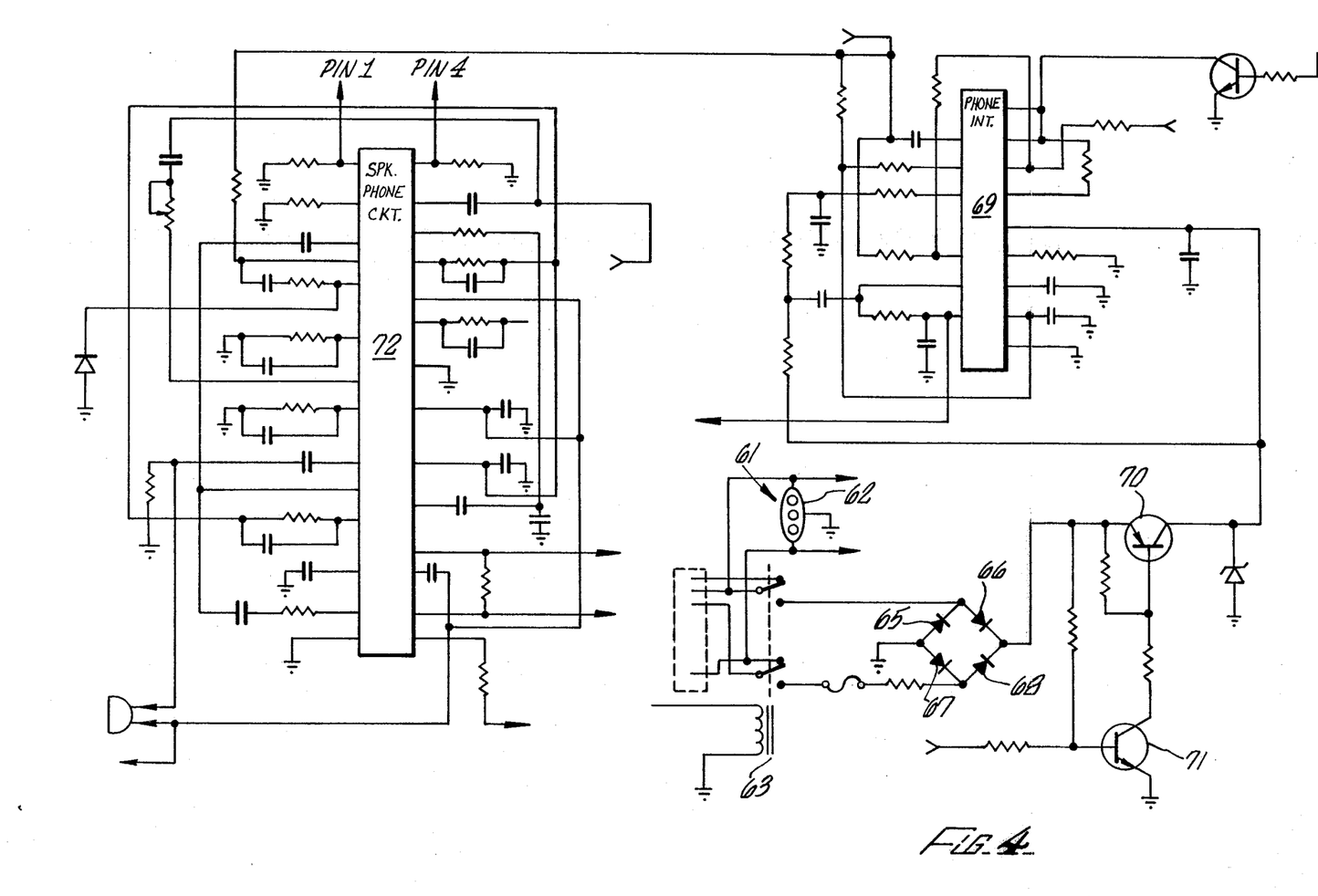
FIG. 4 is a schematic of the telephone interface of the master unit.

The master unit 10 communicates with the central control station 11 by means of a standard telephone line 14. FIG. 4 illustrates the schematic of the telephone interface 60 and the circuit that provides two-way voice communication, namely the speakerphone 61.

Lightning protection 62 is provided for the master unit 10 by means of ground connector 62. Relay 63 provides the hook-switch function 64 when the master unit 10 is activated. The relay 63 is connected so that the user can use either a dual phone jack RJ11 or a RJ31X telephone jack. The RJ31X jack disconnects other telephones in the secured area 12 from the line 14 when the master unit 10 is activated. Thus should another phone in the system on the same line be in use, off the hook, or another call is coming into the system, or there are two or more telephone lines with the same telephone number the RJ31X telephone jack ensures that the master unit 10 connects with the central control station 11.

A bridge of diodes 65, 66, 67 and 68 provides DC rectification for power to the telephone speech interface IC 69. Transmitters 70 and 71 provide the master unit 10 with pulse dial capability and are controlled by the microprocessor 18. IC 69 controls the DC line current as well as the telephone line level. All communications with the central station, both digital control and voice, utilize this IC 69. IC 72 is commonly known as a speakerphone circuit. It is utilized for voice communication in the speakerphone mode of operation. IC 72 is also utilized for the High Gain Microphone mode of operation. In this mode Pins 2 and 28 are grounded by IC 73. The microphone 16 shown on the schematic is mounted on the font panel of the master unit 10.

Figure 5:
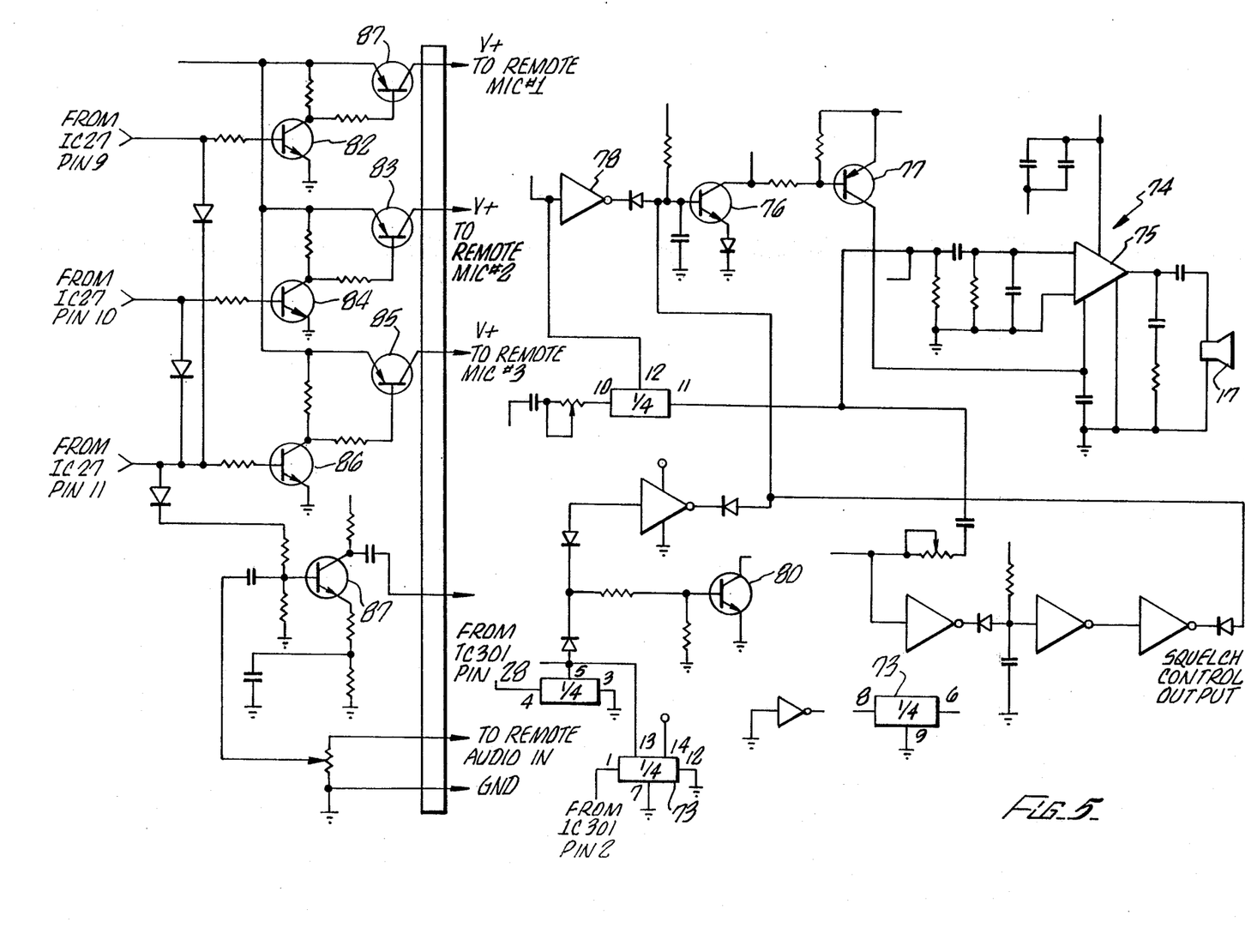
FIG. 5 is a schematic of the audio frequency filter and security data detector of the master unit.

FIG. 5 illustrates the schematics of the audio power amplifier circuit 74 to drive the speaker 17. The switching circuits to control the inputs and on-off functions of the power amplifier circuit 74, and the remote microphone 13 audio and power control circuits.

The output from amplifier 74 drives the speaker 17 mounted on the front panel of the master unit 10. The amplifier IC 75 has a two-watt output capability. The speaker 17 is used for speakerphone 61 operation, talk only, and to sound all beep tones. Transistors 76 and 77 control the on-off state of the audio power amplifier IC 75. The transistors 76 and 77 maintain the speaker 17 in the off state except during speakerphone 61 operation, speaker only operation and alarm beeps. IC 78 provides logic control functions for the squelch circuit of transistors 76 and 77.

IC 79, Pins 10, 11 and 12 is an analog switch which is turned on during talk only operation and routes the audio directly into the audio power amplifier IC 75. IC 79, Pins 3, 4, 5, 1, 13 and 14 control the speakerphone circuit during speakerphone 61 and high gain microphone 16 operation. Transistor 80 turns the speakerphone circuit on during speakerphone 61 and high gain microphone 16 operation. Transistors 81, 82, 83, 84, 85, 86 and 87 are used to control the power to the respective remote microphones 1 to 3, and to amplify the audio output of the remote microphones 81 to 87. All remote microphones 81 to 87 are high sensitivity microphones, and are controlled by the central control station 11.

Figures 6A, 6B, 6C:
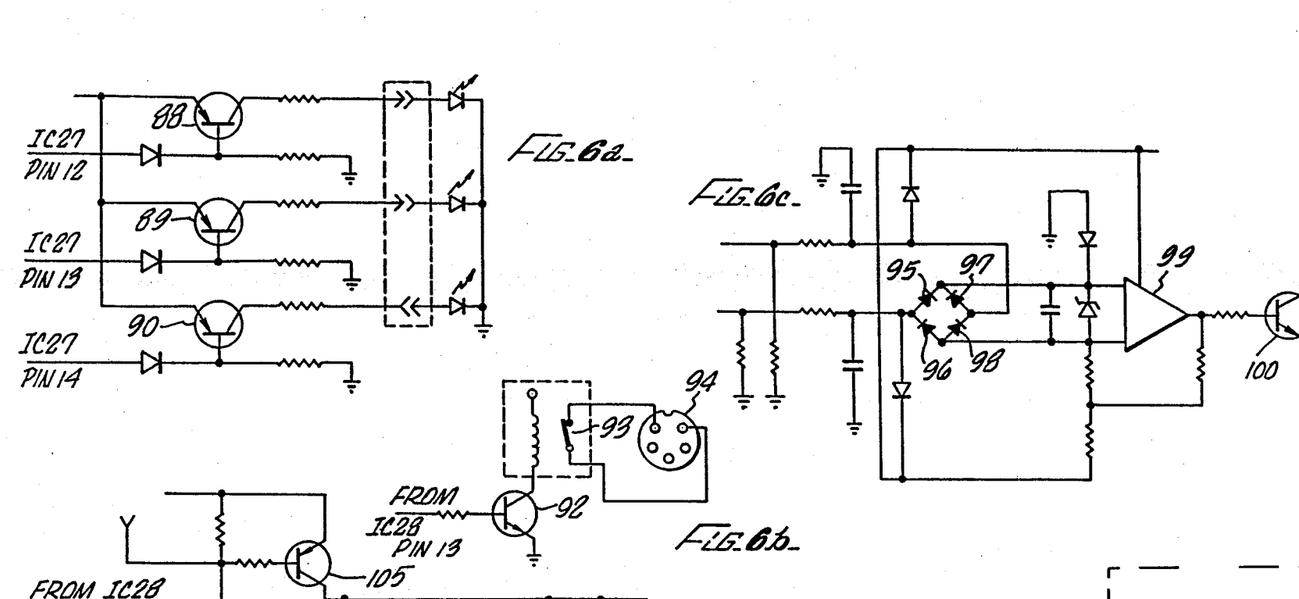
FIGS. 6a, 6b, 6c, 6d and 6e are accessory circuits for the master unit, the circuits of FIGS. 6c and 6d being interconnected.
Figure 6D:
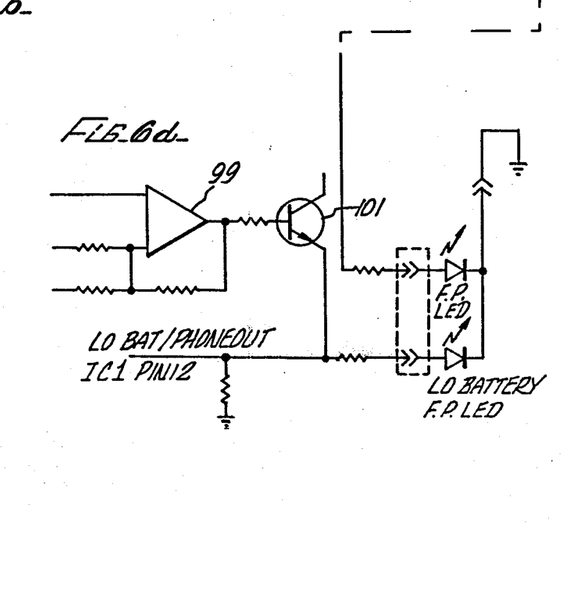
Figure 6E:
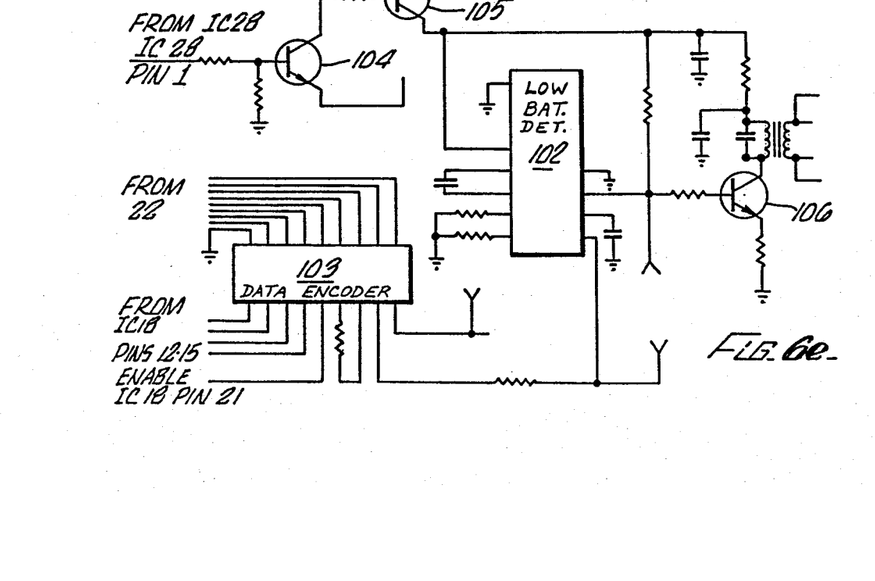

FIGS. 6a, 6b, 6c, 6d and 6e are the schematics of five separate accessory circuits for procedure control functions of the master unit 10. The functions are flashing lamp control (FIG. 6a), a dry contact remote control closure (FIG. 6b), phone line out detector (FIG. 6c), low battery detector (FIG. 6d) and carrier current transmitter (FIG. 6e).

The flashing lamp control circuit includes transistors 88, 89 and 90. These transistors control switches used by the computer at central control station 11 to flash the police, fire and medical lamps at the master unit 10 front control panel 91.

The dry contact remote control includes transistor 92, which is controlled by the microprocessor 18 to close the contact of Switch 93. The contacts are connected to Plug 94 and may be used to control remote functions with separate ground potential. Both contacts are isolated from the master unit 10.

The phone line out detector 94 employs as the major components the diode bridge consisting of diodes 95, 96, 97 and 98, one half of IC 99 and transistor 100. The detector 94 senses whether the telephone line 14 is operational by detecting the DC level on the line 14. Should the telephone line 14 not be operational, transistor 100 is turned on and the phone-out lamp on the front panel 91 is then on. The phone-out lamp remains on until the IC 99 detects a satisfactory DC line level.

The low battery detector includes the circuits of the second half of IC 99 and transistor 101 form the low battery detector 102. Any time the battery level drops below operating level, the IC 99 turns on transistor 101 which in turn provides power to the low batter lamp on panel 91 and signals the microprocessor 18 by means of IC 19.

The carrier current transmitter portion 107 of the master unit 10 consists of the circuits of IC 102. IC 103, transistor 104, 105 and 106.

IC 103 is the digital data encoder. The 12-bit digital word generated by the IC 103 consists of 8 bits which represent the users house code as set on the 8-position dip switch 22, and 4 bits of control information which is provided by the microprocessor 18.

IC 102 generates the frequency shift keyed carrier current frequency. The output of IC 102 drives the carrier current power amplifier, being transistor 106. Transistors 104 and 105 control power to the carrier current transmitter 107.

FIG. 7 illustrates the RF receiver section. This consists of the RF receiver, being transistors 108 and 109, the digital data amplifier, being transistors 110 and IC 111, the noise filter, IC 112, and the 12-bit data decoder, being transistor, IC 113. Transistors 108 and 109 form a super-regenerative receiver. The incoming signal from an antenna 200 is amplified by transistor 108. Transistor 109 is the super-regenerative detector. The data output from the super-regenerative detector is amplified by the circuit of transistor 110 for use by IC 111. IC 111 reshapes the received data into squarewave form for use by the noise filter and decoders. The noise filter of IC 112 prevents short noise spikes from being sent to the decoders 113 where they may cause false signal decoding.

Two data decoders are used by the master unit 10. Pin 3 of the IC 112 supplies the input of both decoders. 8-bit data words are decoded by the microprocessor 18. The 12-bit data words are decoded by IC 113. IC 113 verifies that the house code of secured area is correct and if four identical words are received. When a valid word is received, a data valid signal is sent to the microprocessor 18 from IC 113 Pin 17, and at the same time the 4-bit data word presented in parallel format is provided on IC 113 Pins 10 through 13.

The antenna 200 is mounted on the casing of the master unit 10 and is set to receive signals from the remote control unit which can be located outside the perimeter of the secured area, for instance, carried by a user.

Figure 8:
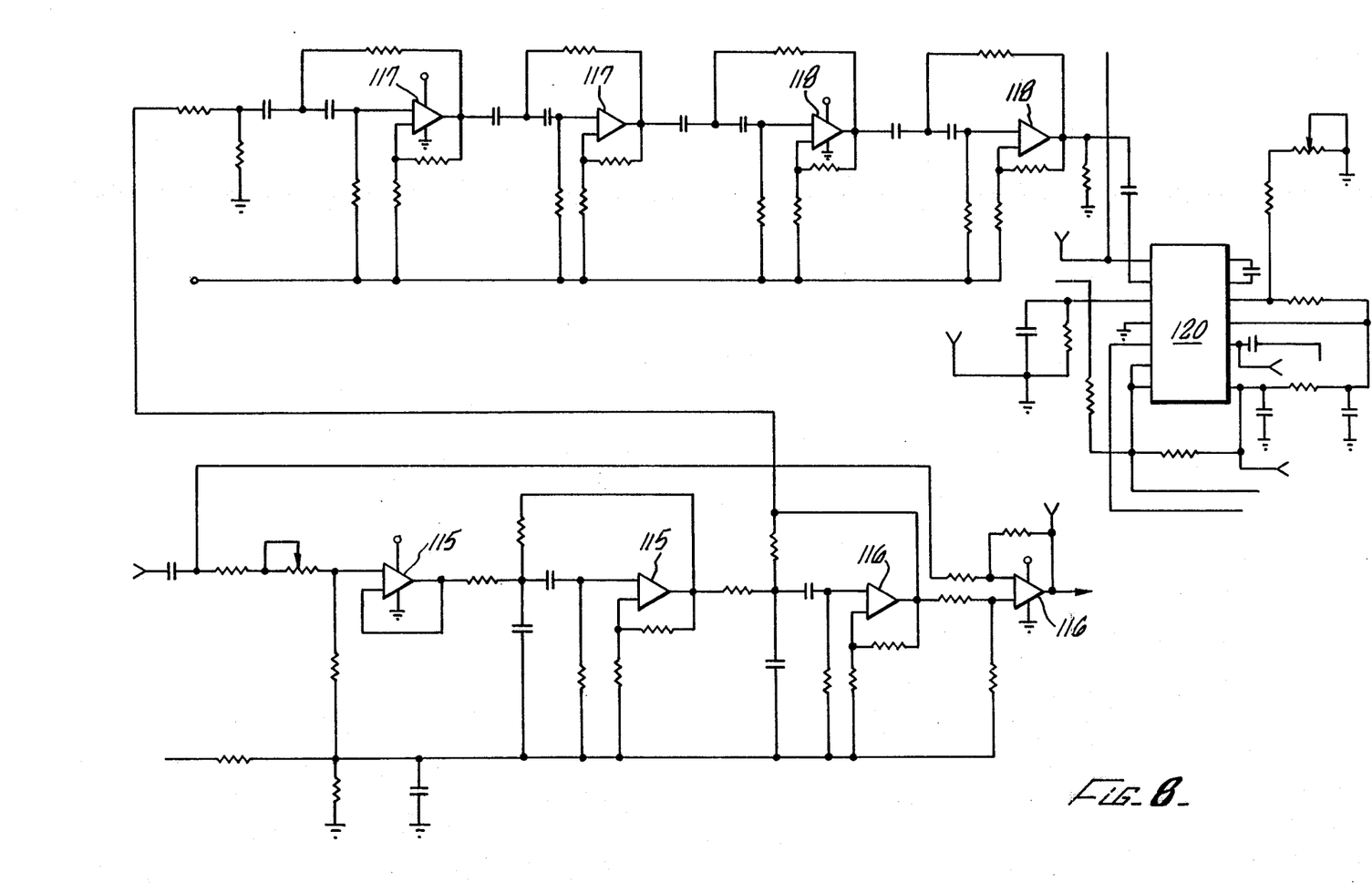
FIG. 8 is a schematic of the audio filter and security data detector.

FIG. 8 illustrates the audio filter 114 and security data detector. This section of the master unit 10 allows the unit 10 to perform in a manner normally found only in duplex systems.

IC 115 and IC 116 form a band reject filter which prevents commands being received from the central control station 11 from reaching the speaker 17. The output of IC 116 Pin 7 is the band reject filter output and provides all received audio to the master unit 10. IC 116 Pin 1 provides the audio data for all commands from the central control station 11.

IC 117 and IC 118 provide an eight pole high pass filter 119. This filter 119 prevents voice signals from entering the central station 11 data decoder IC 120. This filter 119 has a corner frequency of approximately 1800 Hertz. IC 120 decodes all commands from the central station 11. The output of IC 120 provides the command data to the microprocessor 18 in serial format. IC 120 also provides a squelch signal to the audio power amplifier 74 to turn off the speaker 17 and microphone 120 any time command data is being received from the central station 11.

Figure 9:
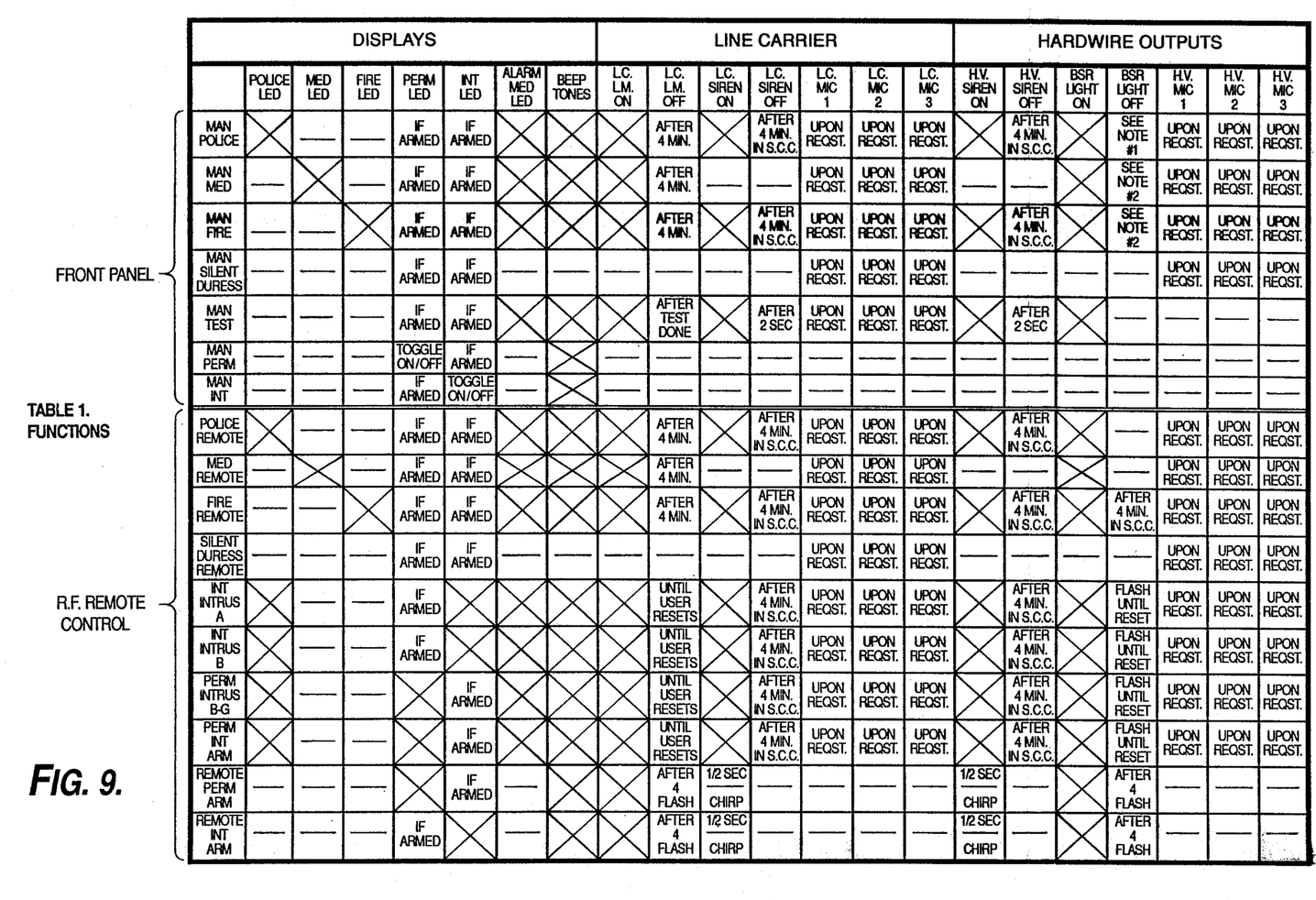
FIG. 9 is a Table indicating the different available functions against available reactions.

In FIG. 9 the various functions of the security system, remote control unit and central control station are indicate in the Table.

On the left-hand side of FIG. 9 the Table indicates the various function signals for which the master unit 10 can be set. The first seven lines indicate function control by the front panel of master unit 10. The lower ten lines indicate remote control through RF commands through a remote control unit. Along the top of the Table the reaction to the function signal controls is indicated. The first eight columns indicate display reaction on the master unit 10; the next seven columns indicate the line carrier responses; and the next eight columns the hardwire outputs. An "x" in a particular box indicates an enabled condition and a "-" indicates disabled or non-applicability of a particular reaction.

In an exemplary situation, in response to a manual police activation switch on the front panel, the police LED light should be lit up as indicated by the "x". There will be no reaction on the medical LED or fire LED. If armed, the perimeter LED will also light as will the interior LED light. The alarm memory LED will also light and there may be operational beep tones from the master unit. Under the line-carrier response the light module would be switched on, and thus a porch light or other light may be activated. After four minutes the light module switches off. Similarly a siren will switch on and after four minutes would switch off. Upon request from the central control station 11, the line-carrier microphones 1, 2 or 3 can be switched on collectively or selectively.

In an additional an alternative system the hardwire outputs would be connected in place of or with the line carrier outputs such that a hardwire siren would be on for four minutes, a light would be on for a four-minute period, and the hardwired microphones on as requested or off if so set by the central control station !1. Similarly, other functions can be activated. The interior of the secured area can be divided into different zones as indicated by the function control for instance, as A, B, and B to G. Selectively, interior and perimeters can be armed as required, and the light modules flash, or switch off after a period of time or remain on constantly until reset.

The alarm memory lamp is an indicator light which flashes whenever there is an alarm activation of any kind, except for silent duress, the flash will continue until the user is in two-way contact with the central control station 11, at which time it will remain on steady. After two-way voice contact is complete, the alarm memory indicator lamp 191 will resume and remain flashing until the user resets the master unit 10.

In operation of the security system of the invention, the master unit 10 can be set for separate interior and perimeter protection. Multiple personal digital security codes are available to the user in the secured area. The amplification from the audio power amplifier 74 at speaker 17 provides a gain in the order of about 16 times. Thus the master unit 10 is highly sensitive to input at the master unit 10 and provides for high volume-output loud amplification through a speakerphone 16 which could be useful in warning intruders in a secured area 12. The high-volume amplification also provides increased sensitivity of the central control station 11 to monitor remote microphones 13 through the master unit 10. The master unit 10 under control of the central control station 11 can identify different zones in the secured area 12, both in an interior sense and a perimeter sense, and listening remote microphones 13 can be selectively operable from distances as far as about 200 feet from the master unit.

Detectors 13 are located in the interior of the secured area 12 and the program at the central control station 11 can selectively switch from one or more interior or perimeter detectors 13 in the secured area 12 thereby to trace the passage of events in zones in a secured area. With this ability an operator at the central control station 11 can discriminate as to whether the security of the secured area has been violated, or whether the activation of a detector is false. The intervention of the central control station 11 operator between the user in a secured area 12 and the emergency services assists in the discrimination of false alarms from alarms requiring response.

To insure that a user is aware that the master unit 10 is armed, there is a positive audible feedback, in the nature of a chirp from the siren 30 of short duration immediately after the master unit 10 is armed or disarmed remotely by a remote control unit. Similarly, the audible feedback provides a belated chirp from siren 30 when a perimeter zone is armed at the master unit 10 when in an exit delay mode.

A fire detector unit and selected lights in the secured area 12 are adapted for communication with the master unit 10. Detectors on doors and windows of a home, the siren and microphones are selectively hardwired or communicated by line carrier through the existing a.c. mains supply system in the secured area 12 connected with a master control unit 10. Selectively an infrared sensor can be located in a secured area 12 to detect movement and the pattern of movement within a predetermined zone and selectively activate a siren. Additional detectors can be applied to further secured areas as required. One or more light modules can be connected through power line carrier to the master unit.

In the event of an activation by intrusion, a light possibly located in an easily viewed window can flash in order to indicate to the homeowner a possible break-in so caution can be exercised before entering a residence. The light can also be operated in a normal manner by the homeowner.

The system also provides the central control station operator with special intelligence information wherein the operator can determine a sequence of events; such as a door or window perimeter intrusion followed by an infra-red detector activation signifying an interior activation. This special information coupled with the "listen-in" capability through the microphones provides significant diagnostic data to the operator to minimize false dispatch of police personnel.

The invention has been described with reference to an example. Many modifications are possible as would be apparent to those skilled in the art. For instance, in addition to the telephone line connection between the master unit and central control station it is possible to provide for R.F. communication directly or indirectly through a neighboring or nearby master unit. The scope of the invention is to be determined by the appended claims.

We claim:

1. A security system comprising a master alarm unit for location in a secured area, the unit including means for telephone connection with a central control station, multiple remote detectors for location in different zones in the secured area, at least some of the remote detectors having a microphone for listening in to the zone where located, and means for operationally connecting the detectors with the master unit such that on activation of the master unit due to activation of at least one remote detector, the central control station receives a function signal from the master unit and is enabled to identify which remote detector is activated, the master unit including a speaker phone with an amplifier for selective operation in a high-volume output mode, and means in the master unit for selectively responding to a signal from the central control system to permit operation in a high-volume output mode.

2. A system as claimed in claim 1 wherein the master unit is connected to a mains power supply to the secured area, and microphones in the remote detector units are connected to the master unit through a line carrier of the mains power supply in the secured area.

3. A system as claimed in claim 2 wherein the secured area has a perimeter and an interior, and wherein the master unit is adapted to respond to remote detectors located in the interior of the secured area and about the perimeter of the secured area, the interior detectors and perimeter detectors being selectively armed.

4. A system as claimed in claim 3 including a remote control unit for operating the master unit; means for feedback signalling responsiveness to arming or disarming of the master unit from remote control operation, and an RF signalling generator for transmitting an operating signal from the remote control unit to the master unit.

5. A system as claimed in claim 4 wherein the feedback means generates an audible signal, and selectively is an output from a siren located adjacent the secured area.

6. A system as claimed in claim 5, including means for delaying the response of the feedback signal.

7. A system as claimed in claim 3, including means for feedback signalling in response to arming or disarming perimeter detectors.

8. A system as claimed in claim 7, wherein the feedback means generates an audible signal, and selectively is an output from a siren.

9. A system as claimed in claim 8, including means for delaying the response of the feedback signal.

10. A system as claimed in claim 1, including RF transmission means for selective additional connection of the master unit directly or indirectly with the central control station.

11. A system as claimed in claim 1, wherein the master unit includes a switch for selectively signalling the central control station as a function signal a need for the emergency services of at least one of the police, medical or fire departments, and additional switches for signalling as a function signal a silent duress and a test signal, at least some of the switches being operable by a user selectively from or remotely of the secured area.

12. A system as claimed in claim 1, wherein the central control station includes means for distinguishing the function signal received from the master unit.

13. A system as claimed in claim 1, wherein the central control station includes means for storing data related to the secured area, and means for selectively displaying such data on activation of a master unit in the secured area.

14. A system as claimed in claim 13, wherein the central control station includes means for connecting in communication an emergency service, selectively being the police, medical or fire department with an activated master unit.

15. A system as claimed in claim 11 wherein the central control station includes means for distinguishing the function signal received from the master unit.

16. A security system comprising a master alarm unit for location in a secured area, the unit including means for telephone connection with a central control station, multiple remote detectors for location in different zones in the secured area, at least some remote detector units including a microphone for listening in to the zone where located, means for operationally connecting the detector units with the master unit to transmit a function signal from the master unit due to activation of at least one remote detector to the central control station, the master unit including a switch for selectively signalling the central control station as a function signal a need for the emergency services of at least one of the police, medical or fire departments, and additional switches for signalling as a function signal a silent duress and a test signal, at least some of the switches being operable by a user selectively from or remotely of the secured area, and wherein the central control station receives a function signal from the master unit and is enabled to identify the source of the function signal, and wherein the master unit includes a speaker phone with an amplifier for selective operation in a high-volume output mode, and means in the master unit for selectively responding to a signal from the central control system to permit operation in the high-volume output mode.

17. A system as claimed in claim 16, wherein the central control station includes means for storing data related to the secured area, and means for selectively displaying such data on activation of a master unit in the secured area.

18. A system as claimed in claim 16, wherein the central control station includes means for connecting in communication an emergency service, selectively being the police, medical or fire department with an activated master unit.

19. A system as claimed in claim 16 wherein the master unit is connected to a mains power supply to the secured area, and microphones in the remote detector units are connected to the master unit through a line carrier of the mains power supply in the secured area.

20. A master alarm unit for location in a secured area and for operation in a security system, the unit comprising means for telephone connection with a central control station, including a speaker phone with an amplifier for selective operation in a high-volume output mode, and means for selectively responding to a signal from the central control system to permit operation in the high-volume output mode, and means for operationally connecting multiple remote detectors for location in different zones in the secured area with the unit such that on activation of the unit due to activation of at least one remote detector, the central control station receives a function signal from the unit and is enabled to identify which remote detector is activated.

21. A master alarm unit as claimed in claim 20 including means for connecting the unit to a mains power supply to the secured area, and wherein the remote detectors are connected to the unit through a line carrier of the mains power supply in the secured area.

22. A master unit as claimed in claim 21, including a switch for selectively signalling the central control station as a function signal a need for the emergency services of at least one of the police, medical or fire departments, and additional switches for signalling as a function signal a silent duress and a test signal, at least some of the switches being operable by a user selectively from or remotely of the secured area, and wherein the central control station receives a function signal from the unit and is enabled to identify the source of the function signal.

23. A method for securing an area with a security system comprising the steps of locating a master alarm unit in the secured area connecting the unit by telephone with a central control station, connecting multiple remote detectors located in different zones in the secured area with the master unit such that on activation of the master unit due to activation of at least one of the remote detectors, the central control station receives a function signal from the master unit and is enabled to identify which remote detector is activated, listening in to one or more of the zones wherein at least some remote detectors are located, and amplifying signals from the remote detectors with an amplifier for selective operation in a high-volume mode, in response to a signal from the central control system.

24. A method as claimed in claim 23 including amplifying an output from the master unit for operation in the high-volume output mode.

25. A method as claimed in claim 23 including connecting the master unit to a mains power supply to the secured area, and connecting microphones in the remote detector to the master unit through a line carrier of the mains power supply in the secured area.

26. A method as claimed in claim 23, including switching the master unit for selectively signalling the central control station as a function signal a need for the emergency services of at least one of the police, medical or fire departments, and additionally switching as a function signal silent duress and a test signal, at least some of the switching being effected by a user selectively from or remotely of the secured area.

27. A method as claimed in claim 26, wherein the central control station distinguishes the function signal received from the master unit.

28. A method as claimed in claim 27, including storing data related to the secured area, and selectively displaying such data on activation of a master unit in the secured area.

29. A method as claimed in claim 28, including connecting in communication an emergency service, selectively being the police, medical or fire department with an activated master unit.

30. A security system comprising a master alarm unit for location in a secured area, the unit including means for telephone connection with a central control station, multiple remote detectors for location in different zones in the secured area, at least some of the remote detectors having a microphone for listening in to the zone where located, and means for operationally connecting the detectors with the master unit such that on activation of the master unit due to activation of at least one remote detector, the central control station receives a function signal from the master unit and is enabled to identify which remote detector is activated, the master unit being connected to a mains power supply to the secured area, and wherein microphones in the remote detector units are connected to the master unit through a line carrier to the mains power supply in the secured area.

31. A system as claimed in claim 30 wherein the secured area has a perimeter and an interior, and wherein the master unit is adapted to respond to remote detectors located in the interior of the secured area and about the perimeter of the secured area, the interior detectors and perimeter detectors being selectively armed.

32. The apparatus of claim 31 including a remote control unit for operating the master unit; means for feedback signalling responsiveness to arming or disarming of the master unit from the remote control operation, and an RF signalling generator for transmitting an operating signal from the remote control unit to the master unit.

33. The apparatus of claim 32 wherein the feedback means generates an audible signal, and selectively is an output from a siren located adjacent the secured area.

34. The apparatus of claim 33, including means for delaying the response of the feedback signal.

35. The apparatus of claim 31, including means for feedback signalling in response to arming or disarming perimeter detectors.

36. The apparatus of claim 35, wherein the feedback means generates an audible signal, and selectively is an output from a siren.

37. The apparatus of claim 36, including means for delaying the response of the feedback signal.

38. The apparatus of claim 30, including RF transmission means for selective additional connection of the master unit directly or indirectly with the central control station.

39. The apparatus of claim 30, wherein the master unit includes a switch for selectively signalling the central control station as a function signal a need for the emergency services of at least one of the police, medical or fire departments, and additional switches for signalling as a function signal a silent duress and a test signal, at least some of the switches being operable by a user selectively from or remotely of the secured area.

40. The apparatus of claim 39, wherein the central control station includes means for distinguishing the function signal received from the master unit.

* * * * *